United States Patent
Alberti et al.

(10) Patent No.: US 9,124,609 B2
(45) Date of Patent: Sep. 1, 2015

(54) ENSURING CONSISTENCY OVER TIME OF DATA GATHERED BY DISTINCT SOFTWARE APPLICATIONS

(75) Inventors: Enrica Alberti, Rome (IT); Mauro Arcese, Fontana Liri (IT); Fabio Cerri, Rome (IT); Rosario Gangemi, Lavinio (IT)

(73) Assignee: International Business Machines Corporation, Armonk, NY (US)

( * ) Notice: Subject to any disclaimer, the term of this patent is extended or adjusted under 35 U.S.C. 154(b) by 1541 days.

(21) Appl. No.: 12/306,311

(22) PCT Filed: Mar. 13, 2007

(86) PCT No.: PCT/EP2007/052355
§ 371 (c)(1),
(2), (4) Date: Dec. 23, 2008

(87) PCT Pub. No.: WO2008/000527
PCT Pub. Date: Jan. 3, 2008

(65) Prior Publication Data
US 2009/0282097 A1 Nov. 12, 2009

(30) Foreign Application Priority Data
Jun. 26, 2006 (EP) .................................... 06116047

(51) Int. Cl.
*G06F 15/16* (2006.01)
*G06F 7/00* (2006.01)
(Continued)

(52) U.S. Cl.
CPC ...... *H04L 67/1095* (2013.01); *G06F 17/30371* (2013.01); *G06F 17/30575* (2013.01)

(58) Field of Classification Search
CPC ................... G06F 17/30575; G06F 17/30581; G06F 17/30578; G06F 17/30174; G06F 17/3056; H04L 67/1095
USPC ......... 709/206, 224, 203, 205, 217, 219, 248; 707/201, 610, 611, 612, 613, 614, 615
See application file for complete search history.

(56) References Cited

U.S. PATENT DOCUMENTS 6,662,357 B1 * 12/2003 Bowman-Amuah .......... 717/120
6,779,002 B1    8/2004 Mmwaura
(Continued)

OTHER PUBLICATIONS

De Figueiredo Pires P et. al.: "A CORBA based architecture for heterogeneous information source interoperability" Technology of Object-Oriented Languages and Systems, 1997. Tools 25, Proceedings Melbourne, VIC., Australia Nov. 24-28, 1997, Los Alamitos, CA, USA, IEEE Comput. Soc, US, Nov. 24, 1997, pp. 33-49, XP010286317.

(Continued)

*Primary Examiner* — Tae Kim
(74) *Attorney, Agent, or Firm* — Yee & Associates, P.C.; Jeffrey S. LaBaw

(57) ABSTRACT

A method for keeping synchronized data collected by a first and at least one second software applications from respective information sources and stored in a respective first and second data repositories. The method comprises: a) receiving a request to refresh data stored in the first data repository; b) causing the at least one second software application to collect data from the respective information source; c) receiving the data collected by the first and the at least one second software applications from the respective information sources, and d) uploading the received data to the respective first and second repositories.

14 Claims, 6 Drawing Sheets

(51) Int. Cl.
*G06F 17/00* (2006.01)
*H04L 29/08* (2006.01)
*G06F 17/30* (2006.01)

(56) References Cited

U.S. PATENT DOCUMENTS

| | | | |
|---|---|---|---|
| 7,194,538 B1 * | 3/2007 | Rabe et al. | 709/224 |
| 7,299,263 B2 * | 11/2007 | Claudatos et al. | 709/206 |
| 7,403,958 B2 * | 7/2008 | Biswal et al. | 1/1 |
| 7,415,487 B2 * | 8/2008 | Bell et al. | 1/1 |
| 7,506,040 B1 * | 3/2009 | Rabe et al. | 709/223 |
| 7,657,578 B1 * | 2/2010 | Karr et al. | 707/610 |
| 2004/0064484 A1 * | 4/2004 | Polan et al. | 707/200 |
| 2005/0055382 A1 * | 3/2005 | Ferrat et al. | 707/201 |
| 2006/0206768 A1 * | 9/2006 | Varghese | 714/48 |
| 2006/0212846 A1 * | 9/2006 | O'Farrell et al. | 717/116 |
| 2007/0038823 A1 * | 2/2007 | Banks | 711/162 |
| 2008/0147750 A1 * | 6/2008 | Zondervan et al. | 707/202 |

OTHER PUBLICATIONS

China Patent Office action dated Apr. 13, 2011.

* cited by examiner

ENSURING CONSISTENCY OVER TIME OF DATA GATHERED BY DISTINCT SOFTWARE APPLICATIONS

TECHNICAL FIELD

The present invention generally relates to the field of data processing and data processing apparatuses and systems, and particularly to distributed data processing and distributed data processing systems, particularly to computer networks. More specifically, the present invention relates to the aspects of gathering of data by different software applications from a same or different information sources.

BACKGROUND ART

Distributed data processing and computer networks are nowadays pervasive.

A successful paradigm in distributed data processing is the client-server architecture. A client-server software product generally comprises a client application component, intended to be installed on, and executed by one or more endpoints, i.e. target data processing apparatuses (e.g., Personal Computers—PCs—, workstations, and the like) of a computer network, and a server application component, intended to be installed on and executed by a server data processing apparatus of the network, in data communications relationship with then endpoints.

Some known distributed software products have a client component that comprises a software agent, intended to be installed on and to be executed by several endpoints, and a server component, installed on a network server. The software agents running on the different endpoints are adapted to gather information from one or more information sources available at the respective endpoints, and to upload the gathered information to the server component. The server component manages an information repository, which is a database on which the information gathered and uploaded by the different software agents running on the different endpoints is stored. The server component also includes a specifically-designed user interface through which a user can access the information stored in the repository.

It happens more and more frequently that it is necessary, or at least desirable to integrate two or more already existing, distinct software products into a combined solution, adapted to put together the functionalities offered by each single product, so as to make a more complete and powerful suite available to the customers.

The integration of the two or more existing products into a suite should involve the minimum possible modifications to the products themselves, so as to minimize costs and time to market of the integrated suite.

When integrating two or more existing software products, the necessity may arise of guaranteeing that the data generated by one software application are kept synchronized, and stored in a respective repository at the same time as the data generated by the other software application(s) of the suite. This is for example the case when it is desired to integrate two or more software products of the type described above, each of which is adapted to gather data from an information source available at the endpoint where the software agent is installed, and to upload the data gathered to the server component, for their storage in the proper central repository.

Assuming for example the case that two such products need to be integrated, the scenario to be considered is that of two different software agents that are installed on and executed by an endpoint, and that gather data on the endpoint, either from a same or from different information sources; the data gathered by the two software agents are then independently uploaded to the respective server component, that stores the collected data into the respective repository. Being the two software products distinct, the two software agents installed on and executed by the generic endpoint are each unaware of the existence of the other; they in general start the data collection mechanism in different ways and at different times; in other words, they behave in a totally uncorrelated way. When a user accesses the two repositories, exploiting the respective user interfaces, he/she may note that the information gathered by the two software agents and stored in the two repositories, albeit relating to the same endpoint, tend to differ with the passage of time, because the data are collected at the endpoint at different times.

In the pursuit of the achievement of an integration of the two products, this is regarded as undesirable. This kind of data inconsistency should be avoided, and the data maintained by the two or more software products in the respective repositories should be kept synchronized.

One possible way to synchronize the data is at the server component level; this usually calls for exploiting a database synchronization mechanism, also referred to as "data replication". Each of the two or more software applications to be integrated is responsible of uploading and storing its own data into the respective repository, in the usual way, i.e. in a way totally unaware of the presence of the other application(s). A tool external to the software applications to be integrated together is provided, that is in charge of moving the updated information from one database to the other(s).

Another possible way to keep data synchronized between two or more software applications is at the client component level: in this case, the synchronization of the data is accomplished at the level of the client component, instead of at the level of the server component of the software products. Referring to the above example, let it be assumed that when the software agent of one of the two software products to be integrated collects data also collected by the software agent of the other software product, the upload of the data is also triggered in respect of the data gathered by the other software agent. In other words, every time a software agent, running on a generic endpoint, has to collect data and upload them to the server, so that they are stored in the respective repository, it notifies the other software agent(s) running on that endpoint about its activity, so that also the other software agent(s) can start the data gathering and upload. In this way, over time the information that is stored in the different central repositories and that can be accessed by a user through the user interfaces of the two software products is the same.

SUMMARY OF THE INVENTION

The Applicant has observed that the data replication method discussed above is affected by some drawbacks.

A first drawback is that there is no sharing of the synchronized data at the endpoint(s); in the practice, it may happen that the client component of a software product, installed on and executed by an endpoint, in addition to gather data from an information source, also performs some processing on the collected data, before uploading them to the server component, for their storage in the respective central repository. In the data replication method, only the client component that uploaded the data was able to process them.

A second drawback is that, in order to enable the server component exploit the uploaded data, changes to the server component's code are required; in fact, the server component usually performs operations on the incoming data uploaded by the client components running at the endpoints. When the incoming data are replicated directly from a different database, then a different processing flow needs to be implemented, triggered when the changes to the data stored in the database are not performed by the server component itself.

Concerning the second method discussed above, that involves synchronization at the client component level, a drawback is that it requires modifying the single products to be integrated, e.g. the two software agents intended to be executed by the generic endpoint, so that they know how to inter-operate. In particular, the code of every software agent of the products to be integrated in the suite needs to be changed so as to embed the procedures necessary for invoking and notifying the other software agents.

Another drawback is that when another software product is to be integrated into a previously created suite of software products, the code of the applications already integrated in the products suite needs to be changed again, to take into account the fact that the new application is included in the suite.

A still further drawback is that if one of the software products that are part of the products suite is enhanced in its functionalities, for example to manage additional types of data; and these new data types are to be part of the integration, the other software products of the suite needs to be modified so as to trigger the generation of these new types of data.

In view of the state of the art outlined above, the Applicant has tackled the problem of providing a method for guaranteeing consistency over time of data gathered by different software products when these products are integrated into a suite, that were not affected by the above-mentioned drawbacks.

According to an aspect of the present invention, a method as set forth in the appended claim 1 is provided, for keeping synchronized data collected by a first and at least one second software applications from respective information sources and stored in a respective first and second data repositories.

The method comprises:
a) receiving a request to refresh data stored in the first data repository;
b) causing the at least one second software application to collect data from the respective information source;
c) receiving the data collected by the first and the at least one second software applications from the respective information sources, and
d) uploading the received data to the respective first and second repositories.

According to a second aspect of the present invention, a system as set forth in the appended claim 10 is provided.

According to a third aspect of the present invention, a computer program as set forth in the appended claim 11 is provided.

BRIEF DESCRIPTION OF THE DRAWINGS

The features and advantages of the present invention will be made apparent by the following detailed description of an embodiment thereof, provided merely by way of non-limitative example, which will be made in conjunction with the attached drawing sheets, wherein.

DETAILED DESCRIPTION OF THE PREFERRED EMBODIMENT

Figure 1:
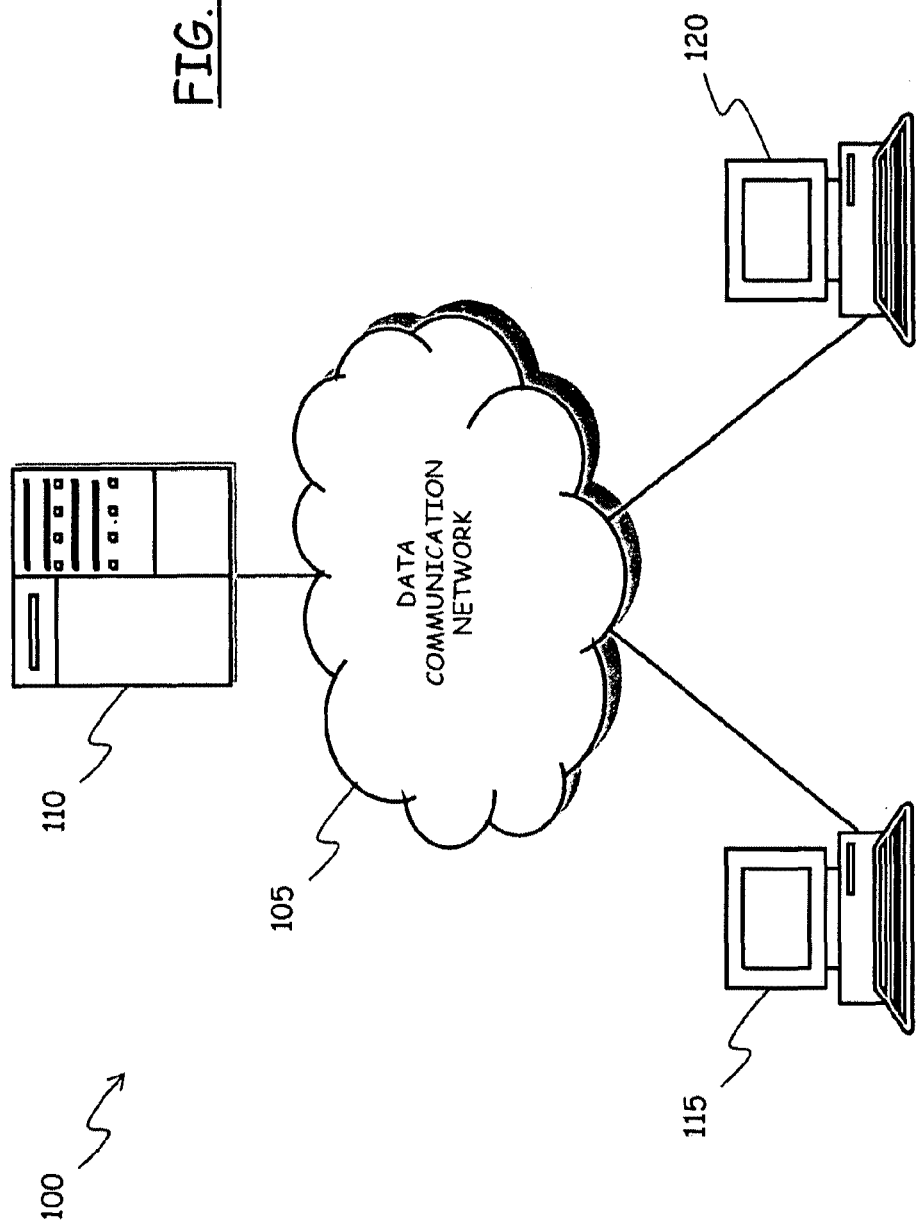
FIG. 1 is a schematic view of a computer network scenario wherein the present invention can be applied.

With reference to the drawings, in FIG. 1 a distributed data processing system 100, particularly a computer network is schematically shown, wherein the present invention can be applied.

The data processing system 100 may for example be the data processing infrastructure of an enterprise, a corporation, a state agency, a university or a research institute, a small office, or the like. The data processing system can be for example a Local Area Network (LAN), a Metropolitan Area Network (MAN), a Wide Area Network (WAN), or a network of networks such as the Internet.

The data processing system 100 comprises a plurality of data processing apparatuses, particularly computers, workstations, storage devices, output devices (e.g., printers), smart phones, personal digital assistants and in general every type of data processing apparatus, interconnected to each other by means of a data communication network 105. For example, the data communication network 105 may be or include an Ethernet network, a WiFi network, a GPRS network, an optical communications network, a Bluetooth network.

For the sake of simplicity, only three computers of the data processing system 100 are shown in FIG. 1: a server computer 110 and two computers 115 and 120 forming the endpoints. The scenario considered by way of example in the present description is one in which two (or generally more) distinct software products, providing different (possibly overlapping) functionalities, and having a client-server architecture need to be integrated into a suite, forming a new software product adapted to provide richer functionalities. Thus, for the purposes of the present description, the server computer 110 is intended to be the computer on which there are installed and run server components of two (or more) distinct software products to be integrated into a suite. The endpoints 115 and 120 are intended to be the computers on which there are installed and run client components of the two (or more) distinct software products to be integrated into the suite.

Figure 2:
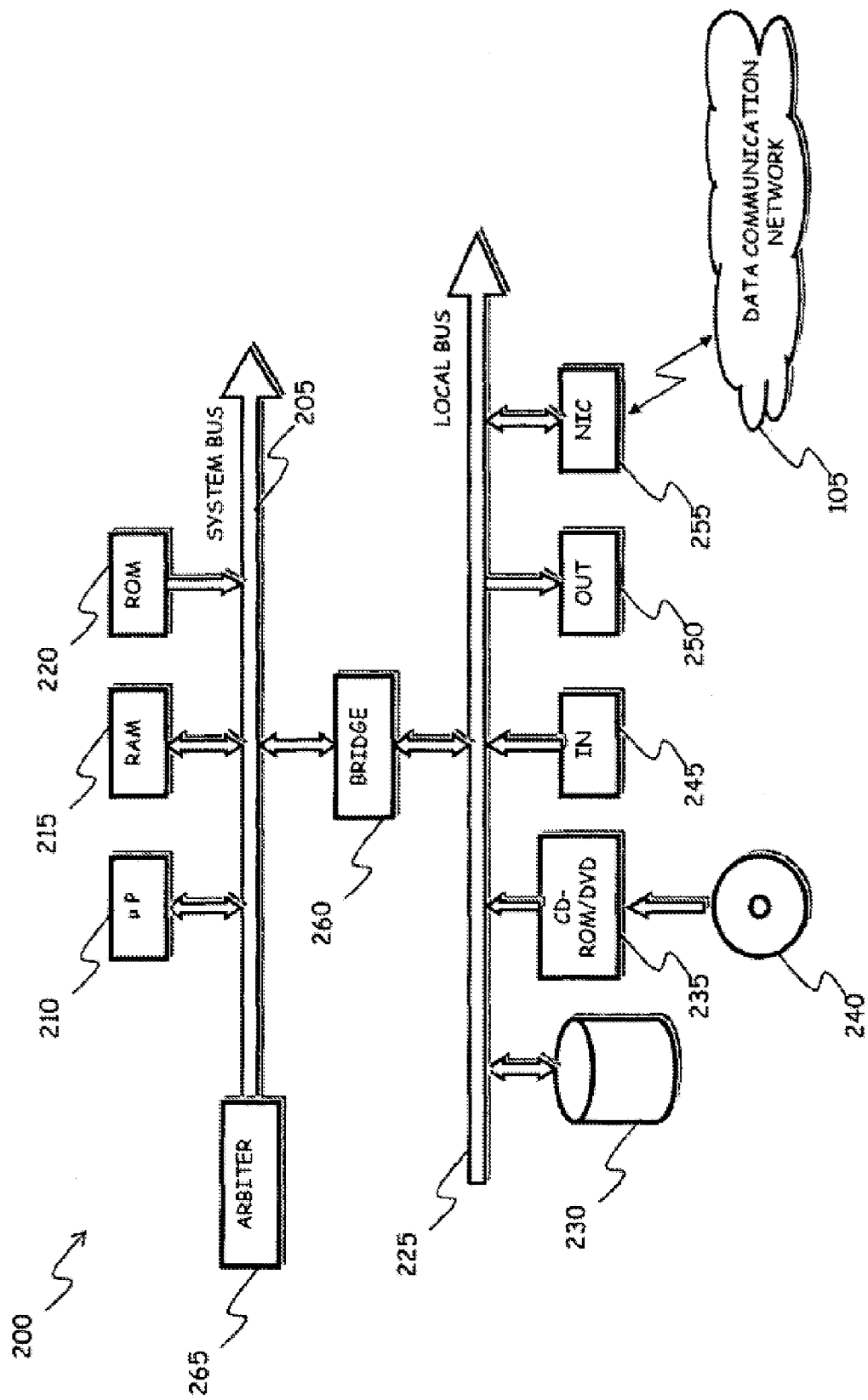
FIG. 2 schematically shows, in terms of functional blocks, the structure of a generic computer of the network.

As shown in FIG. 2, a generic computer of the data processing system 100, such as any one of the endpoints 115, 120, or the server computer 110, comprises several interconnected units, denoted globally 200. In particular, some of the units are connected in parallel to a system bus 205. In detail, one or more microprocessors (μP) 210 control the operation of the computer 200; a RAM (Random Access Memory) 215 is directly used as a working memory by the microprocessors 200, and a ROM (Read Only Memory) 220 (possibly including an EPROM and/or an EEPROM and/or a flash memory) stores the basic code for a bootstrap of the computer 200. Peripheral units are connected (by means of respective interfaces) to a local bus 225. Particularly, mass storage devices comprise a hard disk 230 and a CD-ROM/DVD-ROM drive 235 for reading and, possibly, writing CD-ROMs/DVD-ROMs 240. Moreover, the computer 200 typically includes input devices 245, for example a keyboard and a mouse or similar pointing device, and output devices 250, such as a display device (monitor) and a printer. A Network Interface Card (NIC) 255, e.g. an Ethernet adapter and/or a WiFi adapter, is used to connect the computer 200 to the network 105. A bridge unit 260 interfaces the system bus 205 with the local bus 225. Each microprocessor 210 and the bridge unit 260 can operate as master agents requesting an access to the system bus 205 for transmitting information; an arbiter 265 manages the granting of the access to the system bus 205.

Figure 3:
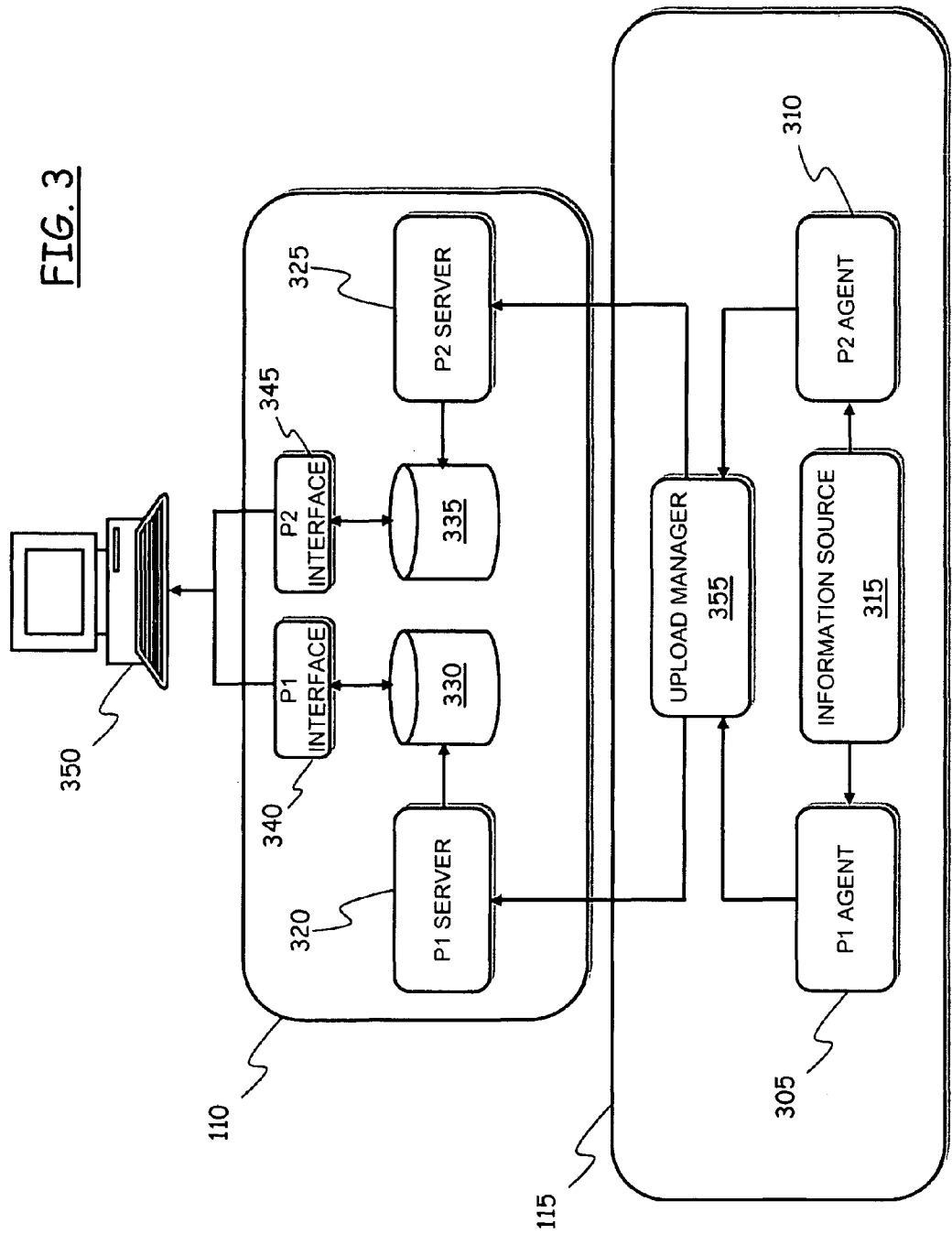
FIG. 3 pictorially shows, in terms of functional blocks, the main modules of a server-side software component, and of a client-side component of an integrated suite of software products according to an embodiment of the present invention.

Reference is now made to FIG. 3, wherein the server component and the client components of the two distinct software products to be integrated into the suite are depicted in greater detail. It is observed that any of the functional blocks depicted in FIG. 3 may either represent one or more software modules, one or more hardware resources, or a mix of software modules and hardware resources. Programs and data are typically stored on the hard disk of the computers and are (at least partially) loaded into the computer working memory when the programs are executed (in the drawing, an operating system as well as other basic application programs concurrently running on a generic computer are not shown, for the sake of clarity).

Assuming the above-mentioned scenario, let P1 and P2 denote the two, distinct software products that need to be integrated to form the suite. Each of the two products P1 and P2 has a client-server architecture, and comprises a client component, intended to be installed and be executed on a generic endpoint, e.g. the endpoint 115, and a server component, intended to be installed and executed on the server 110.

The client component of each one of the two software products comprises a software agent 305 ("P1 agent") and 310 ("P2 agent"), respectively, adapted to gather data from a same or from different information sources 315 available at the endpoint 115, and to upload the data gathered to the respective server component.

The server component of each one of the two software products comprises a server module 320 ("P1 server") and 325 ("P2 server") adapted to receive from the respective software agents 305 and 310 installed on the various endpoints the data that the software agents have collected at the respective endpoints; the server module 320 and 325 is adapted to manage the storage of the received data into a respective central repository 330 and 335. The server component of each one of the two software products further comprises a user interface module 340 ("P1 interface") and 345 ("P2 interface"), adapted to allow one or more users, schematized by a computer 350, to access the respective central repository 330 and 335.

As discussed in the background section of the present description, being the two software products P1 and P2 distinct, the two software agents 305 and 310 installed on and executed by the generic endpoint are generally each unaware of the existence of the other; they in general start the data collection mechanism in different ways and at different times; in other words, they, taken on their own, behave in a totally uncorrelated way.

In order to guarantee that the data related to same endpoints and stored in the central repositories 330 and 335 managed by the server 110 for the two software products P1 and P2 and are kept consistent over time, according to an embodiment of the present invention an upload manager module 355 is provided. In particular, the upload manager module 355 is intended to be installed on and be executed by each of the endpoints. The upload manager module 355 is interposed between the generic software agent of the software product intended to be part of the integrated suite, like the software agents 305 and 310, and the respective server component. In particular, the upload manager module 355 is adapted to intercept data upload requests issued by the generic software agent of the suite running on the endpoint, to consequently command the collecting of data, from the respective information source, to the other software agent(s) running on that endpoint, and then to upload the data gathered by each software agent to the respective server component.

Figure 4:
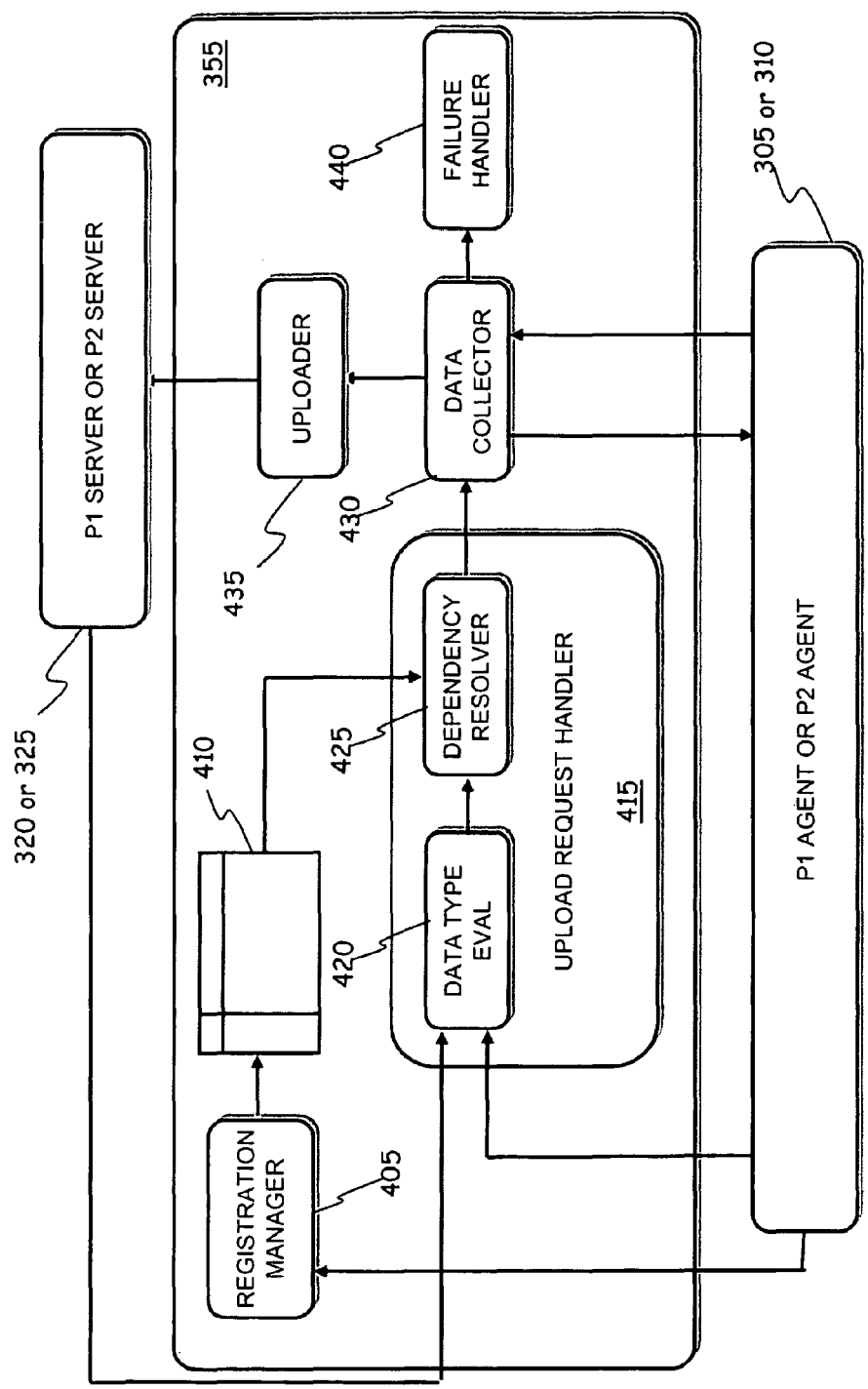
FIG. 4 pictorially shows in greater detail an upload manager module included in the client-side software component, according to an embodiment of the present invention.

FIG. 4 schematically shows in greater detail the structure of the upload manager module 355, in an embodiment of the present invention. A registration manager module 405 receives and handles registration requests from client components of new software products to be integrated into a products suite; in particular, the registration requests are issued when the client component of a new software product is installed on the considered endpoint. The registration manager module 405 manages a dependencies table 410, wherein, for each registered software application, information concerning the type of data handled by such application, and the type of data in which that application is interested is stored, together with the procedure, e.g. the command(s) adapted to cause the software agent collect the data from the respective information source. An upload request handler module 415 intercepts and handles requests of upload of data issued by the client components of the software applications of the suite, installed and running on the endpoint. The upload request handler module 415 comprises in particular a data type evaluator module 420, adapted to evaluate the type of data involved in the request of upload issued by the generic software agent, and a dependency resolver module 425 that, based on the indications provided thereto by the data type evaluator module 420, is adapted to look up in the dependencies table 410 so as to determine, when a request of upload is received by the generic software agent, which other software agents are to be instructed to gather data and upload them to the respective server components, in order to maintain data synchronization. The upload request handler module 415 may also be adapted to receive request of data upload by the server components 320 and 325; these requests are treated in essentially the same way as upload request received from the software agents. The dependencies resolver module 425 feeds a data collector module 430, which, based on the information retrieved by the dependencies resolver module 425 from the dependencies table 410, is adapted to invoke the proper command so as to cause the software agents interested in the type of data specified in the received upload request to gather data from the respective information sources. The data collector module 430 passes the data collected by and received from the invoked software agents to a data uploader module 435, adapted to upload the data to the proper server components, individually for each software agent that has been invoked by the data collector module. A failure handler module 440 is preferably provided, adapted to manage failure situations.

The operation of the upload manager module according to an embodiment of the present invention will be now described. Firstly, the procedure by which a new software product to be added to the integrated products suite registers to the upload manager module is described; then, a detailed description of a method by which the upload manager module manages the upload of data from the client components to the server components of the software products of the suite is described.

Figure 5:
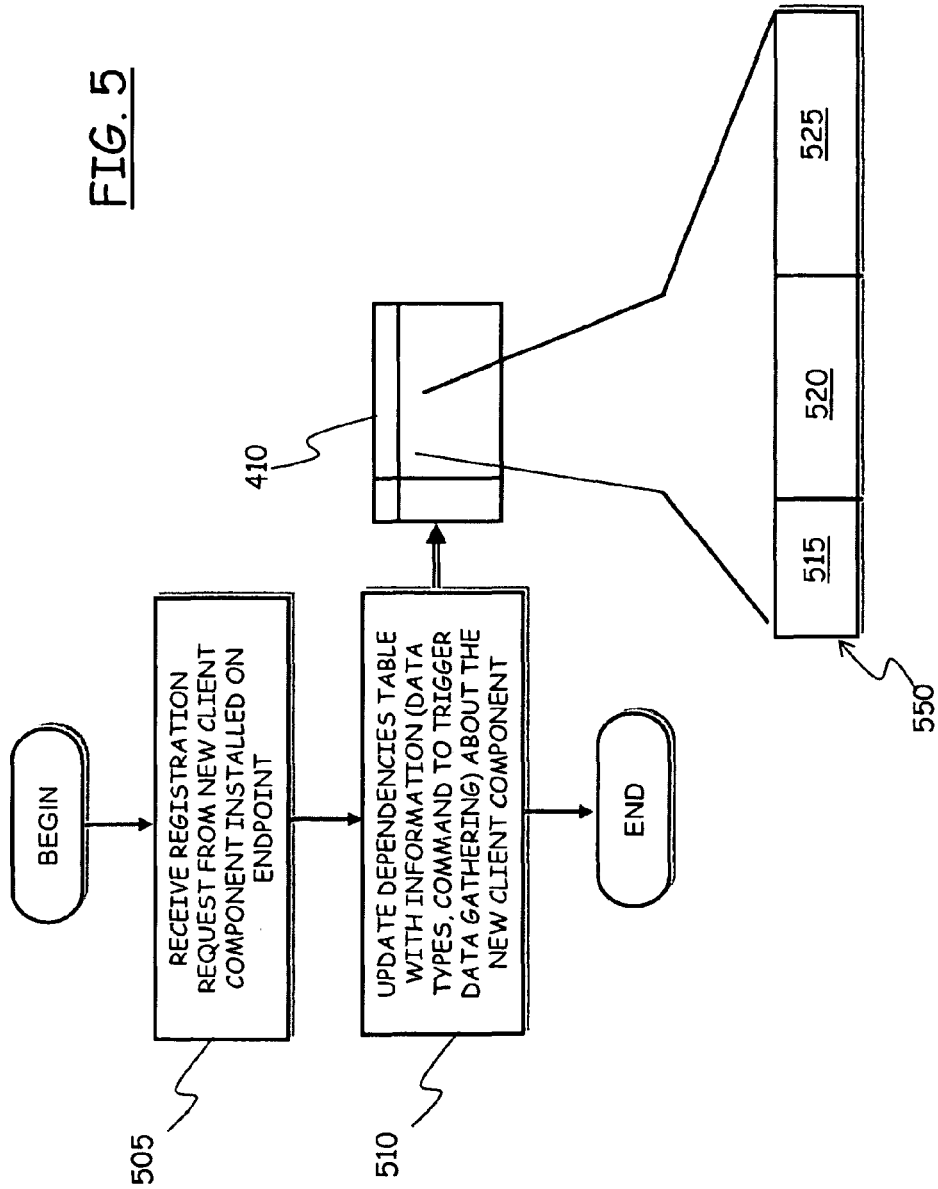
FIG. 5 is a schematic flowchart illustrating a phase of registration to the upload manager module of a new client software component to be integrated in the suite, in an embodiment of the present invention.

Referring to the schematic flowchart of FIG. 5, let it be assumed that a new software product is to be integrated into a products suite; the product suite may be an already existing suite of products, or a suite to be created; for example, let it be assumed that the software product P2 is to be integrated with the software product P1. Let it also be assumed that the upload manager module 355 is already installed and running on the considered endpoint (e.g., the endpoint 115). Upon installing the client component of the software product P1 on the endpoint, the client component being installed, e.g. the software agent 305, issues to the upload manager module 355 a registration request; for example, the client component of the software product P1 may invoke a Command Line Interface (CLI) of the upload manager module 355, passing thereto indications about the type(s) of data the software agent 305 is interested in, and a command that the upload manager module 355 can issue so as to cause the gathering of the specified type of data by the software agent 305, and the upload of the gathered data to the respective server component 320. The registration request is received by the upload manager module 355 (block 505). The upload manager module 355 processes the received registration request, and updates the dependencies table 410 with the information included in the received registration request. In particular, the upload manager module 355 creates a new entry 550 in the dependencies table 410, for the new application; the new table entry is used to store an indication 515 of the new client component, indications 520 of the type(s) of data the new client component is interested in, and the command(s) 525 that has to be invoked to cause the software agent start a data collection and upload. By registering to the upload manager module 355, the software product being installed declares to be interested in the synchronization of the gathered data with the data gathered by other applications.

A similar procedure is followed for registering the software product P2, as well as any other software product that may have to added at subsequent times.

Figure 6:
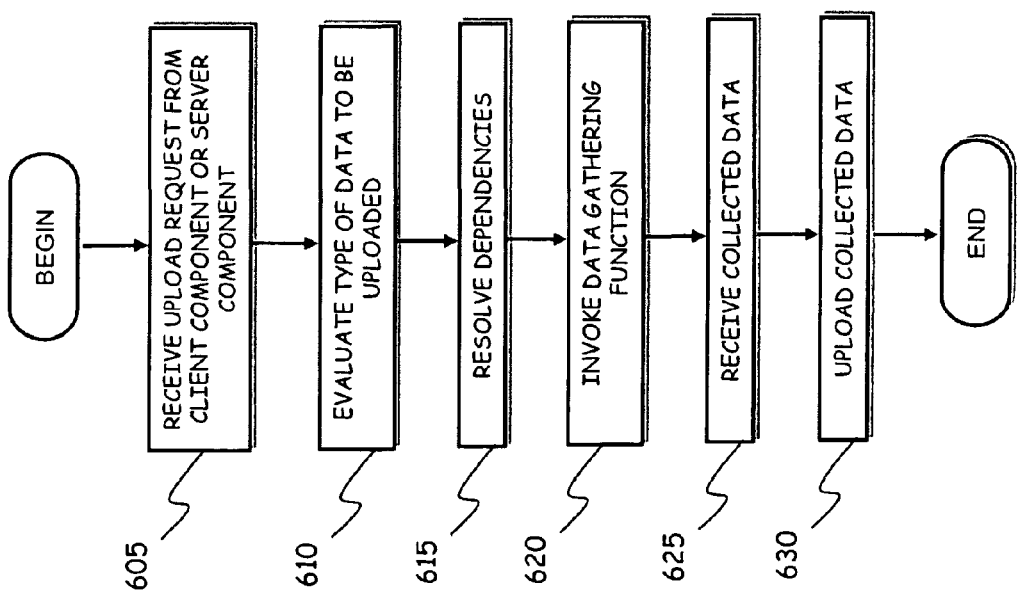
FIG. 6 is a schematic flowchart illustrating a data upload procedure, in an embodiment of the present invention.

Reference is now made to the flowchart of FIG. 6. Let it be assumed that, at a generic time, the (upload request handler module 415 of the) upload manager module 355 receives an upload request issued by one of the client components installed and running on the considered endpoint, for example by the software agent 305, or issued by one of the server components, for example the server component 320 (block 605). The (data type evaluator module 420 of the) upload manager module 355 evaluates the type of data involved in the upload request (block 610), then the (dependencies resolver module 425 of the) upload manager module 355 looks in the dependencies table 410 so as to determine which client components installed on the endpoint are interested in the same type of data specified in the received registration request, i.e. it resolves the dependencies (block 615). The (data collector module 430 of the) upload manager module 355 then invokes each of the client components (i.e., each of the software agents) that, according to the information stored in the dependencies table 410, is interested in the same type of data specified in the upload request (block 620); this is done exploiting the specific commands that are stored in the dependencies table 410. In this way, data are collected by all the relevant client components. For example, let it be assumed that the upload manager module 355 receives an upload request from the software agent 305 of the software product P1; let it also be assumed that the software product P2 is also interested in the same type of data as the software product P1: then, the upload manager module 355 invokes the software agent 310 and causes it to gather data from the respective information source.

The (data collector module 430 of the) upload manager module 355 receives the data collected by the software agents running on the endpoint as they become available (block 625).

When all the data have been collected, from all the invoked software agents, the (uploader module 435 of the) upload manager module 355 uploads (block 630) the data to the proper server component, which will then store them into the respective central repository.

In case of failure in the invocation of one of the software agents (for example, in case the upload manager module 355 receives no responses from an invoked software agent within a specified time-out, possibly after having performed a predefined number of retries), the (failure handler module 440 of the) upload manager module 355 may abort completely the upload of the data, or upload only those data that have been successfully gathered from the invoked software agents, discarding the other data.

It is pointed out that the upload manager module 355, instead or in addition to being triggered by the receipt of an upload request, may carry out the operations described above as a periodic activity, according to a time-out that may be configured within the upload manager in association for example to each type of data; in this case, when the time-out for a given type of data elapses, the upload manager module 355 automatically invokes the registered software agents that are interested in that specific type of data, so as to collect the data, and then uploads them to the respective server components.

An advantage of the present invention is that the generic software product needs not be made aware of the existence of other software products, and it continues to operate as if it were the only entity that is interested in a certain type of data: in the context of a data upload operation, the upload manager module handles the existence of more than one software product interested in a same type of data, and invokes the proper commands to cause the collection and upload of data also from the other software products.

Another advantage is that the central repositories of the different software products to be integrated in the suite can be kept separated and do not share any common part. Thus, from this point of view, each software product is independent from all the others. Only the data are kept synchronized.

Furthermore, only the upload manager module knows all the registered applications with the related managed data types. The addition of a new client component to the environment of an endpoint does not require any change to the existing applications.

The implementation of the solution according to the present invention for already existing software applications requires only minimal changes; these changes are related to the registration phase with the upload manager module (the generic application has to issue a proper registration request) and to the invocation of the upload manager module to request the upload of data.

The data synchronization does not require any change to the server component code. All the application flows remain the same at the server component level. There is no difference between the situation when the application is integrated with another one and when the application is working in a stand alone way.

The implementation of the present invention has been described making reference to an exemplary embodiment thereof, however those skilled in the art will be able to envisage modifications to the described embodiment, as well as to devise different embodiments, without however departing from the scope of the invention as defined in the appended claims.

The invention can take the form of an entirely hardware embodiment, an entirely software embodiment or an embodiment containing both hardware and software elements. In a preferred embodiment, the invention is implemented in software, which includes but is not limited to firmware, resident software, micro-code, etc. Furthermore, the invention can take the form of a computer program product accessible from a computer-usable or computer-readable medium providing program code for use by or in connection with a computer or any instruction execution system. For the purposes of the present description, a computer-usable or computer-readable medium can be any apparatus, device or element that can contain, store, communicate, propagate, or transport the program for use by or in connection with the computer or instruction execution system.

The medium can be an electronic, magnetic, optical, electromagnetic, infrared, or semiconductor storage medium, network or propagation medium. Examples of a storage medium include a semiconductor memory, fixed storage disk, moveable floppy disk, magnetic tape, and an optical disk. Current examples of optical disks include compact disk-read only memory (CD-ROM), compact disk-read/write (CD-R/W) and digital versatile disk (DVD). Examples of a propagation medium include wires, optical fibers, and wireless transmission.

The invention can be applied in a data processing system having a different architecture or based on equivalent elements; each computer can have another structure or it can be replaced with any data processing entity (such as a PDA, a mobile phone, and the like).

The invention claimed is:

1. A method of keeping synchronized data collected by a first and a second software applications from information source and stored in a respective first and second data repositories maintained by a first computing device, comprising:
   receiving, by a second computing device, a request to refresh data stored in the first data repository;
   responsive to receiving the request, causing the second software application to collect data from the information source;
   receiving the data collected by the first and the second software applications from the information source, and
   uploading, by the second computing device, the received data to the respective first and second repositories maintained by the first computing device.

2. The method of claim 1, wherein said request to refresh is received from the first software application.

3. The method of claim 2, wherein said request is received after the first software application has collected data from the information source.

4. The method of claim 1, wherein each of the first and second software applications is a client component of a client-server software product comprising a server component adapted to manage the first and second data repositories by the first computing device, wherein the client component is operable for collecting data from the information source for both the first and second software applications.

5. The method of claim 4, wherein said request to refresh is received from the server component adapted to manage the first and second data repositories.

6. The method of claim 1, wherein uploading is additionally performed at predetermined times.

7. The method of claim 1, wherein said causing the second software application to collect data from the information source is performed conditionally to the fact that the data collected by the first and second software applications have a predetermined correlation.

8. The method of claim 1, comprising:
   upon installing a third software application adapted to collect data from a respective information source to be stored in a respective third data repository, establishing whether the data collected by the third software application have a predetermined correlation with the data collected by the first or the second software application.

9. The method of claim 8, further comprising:
   upon installing the third software application, storing a command for causing the third software application collect data from the respective information source.

10. The method of claim 1 wherein the first and the second software applications run on the second computing device.

11. A system including processor and memory for keeping synchronized data collected by first and second software applications from an information source and stored in respective first and second data repositories maintained by a first computing device, wherein the system memory contains instructions which when executed cause the system to perform the method comprising:
    receiving, by a second computing device, a request to refresh data stored in the first data repository;
    responsive to receiving the request, causing the second software application to collect data from the information source;
    receiving the data collected by the first and the second software applications from the information source, and
    uploading, by the second computing device, the received data to the respective first and second data repositories maintained by the first computing device.

12. The system of claim 11 wherein the first and the second software applications run on the second computing device.

13. A computer program product in a non-transitory computer readable storage medium for keeping synchronized data collected by first and second software applications from an information source and stored in respective first and second data repositories,
    wherein the computer program product contains instructions which when executed cause a data processing system to perform the method comprising:
    receiving a request to refresh data stored in the first data repository;
    responsive to receiving the request, causing the second software application to collect data from the information source;
    receiving the data collected by the first and the second software applications from the information source, and
    uploading the received data to the respective first and second data repositories.

14. The computer program product of claim 13 wherein the first and the second software applications run on the second computing device.

* * * * *